(12) United States Patent
Grodsky et al.

(10) Patent No.: US 7,651,738 B2
(45) Date of Patent: Jan. 26, 2010

(54) SUPRAMOLECULAR COMPOSITE FILM MATERIAL AND METHOD FOR FABRICATING

(75) Inventors: Alexander S. Grodsky, Moscow (RU); Alexander F. Krivoschepov, Malakhovka (RU); Pavel I. Lazarev, London (GB)

(73) Assignee: Nitto Denko Corporation, Ibaraki-shi (JP)

( * ) Notice: Subject to any disclaimer, the term of this patent is extended or adjusted under 35 U.S.C. 154(b) by 633 days.

(21) Appl. No.: 11/132,746

(22) Filed: May 18, 2005

(65) Prior Publication Data

US 2005/0271878 A1   Dec. 8, 2005

Related U.S. Application Data

(60) Provisional application No. 60/578,338, filed on Jun. 8, 2004.

(51) Int. Cl.
*B05D 7/24* (2006.01)
*B05D 3/10* (2006.01)

(52) U.S. Cl. .................. 427/341; 427/346; 427/393.5

(58) Field of Classification Search ................ 427/331, 427/337, 341, 346, 352, 384, 385.5, 393.5
See application file for complete search history.

(56) References Cited

U.S. PATENT DOCUMENTS

| 7,025,900 B2 * | 4/2006 | Sidorenko et al. ...... 252/299.01 |
| 7,045,177 B2 * | 5/2006 | Dutova et al. ................. 428/1.1 |
| 7,204,938 B2 * | 4/2007 | Lazarev .................. 252/299.01 |
| 2002/0135728 A1 | 9/2002 | Tatsuta et al. |
| 2005/0104037 A1 | 5/2005 | Lazarev et al. |
| 2007/0166533 A1 | 7/2007 | Lazarev et al. |

FOREIGN PATENT DOCUMENTS

WO   WO 2004-094559 A1   11/2004
WO   WO 2005/031409 A1   4/2005

OTHER PUBLICATIONS

Chinese Office Action dated Oct. 26, 2007, issued in corresponding Chinese Patent Application No. 200510127428.3.
He Ping-Sheng et al., "Fabricating Component-controlled LB films by Means of "Surface loans" Technique", Department of Polymer Science and Engineering, University of Science and Engineering, Wuli Huazue Xuebao, Acta Phys. -Chim. Sin., 2004, 20 (10), pp. 1275-1280.
Office Action dated Oct. 24, 2006 issued in corresponding Korean Application No. 10-2005-0118773.
Taiwanese Office Action dated May 29, 2008, issued in corresponding Japanese Patent Application No. 094138873.

* cited by examiner

*Primary Examiner*—Thao T. Tran
(74) *Attorney, Agent, or Firm*—Westerman, Hattori, Daniels & Adrian, LLP.

(57) ABSTRACT

The present invention provides an optically anisotropic composite film material possessing improved working characteristics, including hydrolytic stability and mechanical strength with respect to environmental factors. These and other advantages of the present invention may be achieved by creating a supramolecular composite film material. This supramolecular composite film material comprises a matrix of thin crystal film composed of organic supramolecules containing polar groups, and a binding agent representing a water-soluble aliphatic compound containing at least two functional groups.

The present invention further provides a method for manufacturing supramolecular composite film materials possessing these advantageous properties. In one embodiment, the method comprises the following steps: (i) formation of a layer of lyotropic liquid crystal composed of supramolecules of a cyclic organic compound with conjugated $\pi$-systems and substituted polar groups; (ii) application of an external orienting force to said layer and further removal of a solvent with the resulting formation of a thin crystal film; (iii) treatment of the thin crystal film with a solution of inorganic salts leading to the formation of an insoluble crystalline film of supramolecules composed of said organic molecules; (iv) impregnation of said insoluble film with a binding agent capable of interacting with the polar groups with the subsequent formation of a filled film; and (v) drying of said filled film leading to the formation of a supramolecular composite film material.

15 Claims, 5 Drawing Sheets

SUPRAMOLECULAR COMPOSITE FILM MATERIAL AND METHOD FOR FABRICATING

CROSS-REFERENCE TO RELATED APPLICATIONS

This application claims benefit under 35 U.S.C. § 119(e) to application Ser. No. 60/578,338, filed Jun. 8, 2004, the disclosure of which is incorporated herein by reference.

FIELD OF THE INVENTION

The present invention relates generally to the field of crystalline composite film materials. In particular the present invention relates generally to microelectronics, optics, communications, computer technology, and other related fields.

BACKGROUND OF THE INVENTION

The development of modern technology requires creating new materials, in particular composites, that constitute a basis for fabricating optical, electronic, and other elements with desired properties.

Composites or composite materials represent systems composed of two or more different components or in other word phases. One of the components is continuous and is called the matrix or base, while the other components are distributed in the matrix in the form of inclusions, in particular particles, fibers, layers, and are referred to as fillers or dispersed phases. A composite material or a composite is a heterogeneous disperse system, the properties of which are not simple combinations of the properties of components. The properties of a composite material can be controlled by modifying the interaction between the matrix and fillers, by selecting proper fillers, and by varying the ratio of components. An important role in obtaining composite materials with desired properties is played by physicochemical parameters of the filler particles.

A composition for obtaining optically transparent materials was disclosed in U.S. Pat. No. 4,143,017 and comprises copolymers containing unsaturated glycols, water, and an organic fillers imparting improved mechanical properties to the final composite, while retaining high optical properties of the components. The fillers represent polyfunctional monomers containing at least one carboxy group, which serve as cross-linking agents.

Various types of the filler molecules containing polymerizable groups were described in the European Patent EP 0,389,420.

Fillers may represent various combinations of substances, which can be organic and/or inorganic. For example, a liquid-crystalline polymer system and an aqueous polymeric dispersion containing both organic and inorganic fillers, were described in PCT patent publications WO 0040655 and WO 0040629. The inorganic components used were alkaline earth metal salts.

Another example of a polymeric composition used in the liquid crystal display backlight system is disclosed in the European Patent EP 0,847,424 and comprises a polymer film covered with a polymeric binder containing both organic and inorganic fillers. The binder is transparent and retains its optical properties for a long time.

The optical properties of a two-component liquid-crystalline system were studied for anisotropic films based on poly(vinyl alcohol) (PVA) modified with iodine [see Bahadur, B., Liquid Crystals: Applications and Uses, ed., Vol. 1, World Scientific, Singapore, N.Y., July 1990, p. 101].

However many optical materials based on polymers, in particular PVA-based films with dye additives, have relatively low thermal stability which put a limit on their application.

A special class of polymers is represented by supramolecular polymers, see for example Brandveld, L., Supramolecular Polymers, Chem. Rev., 101, 4071-97 (2001). The structural units are linked by noncovalent bonds such as hydrogen bonds, complex bonds, and arene-arene bonds. The monomers represent self-assembly discotic molecules, typically of organic dyes, containing various substituted ionic groups. In aqueous solutions, such discotic molecules exhibit aggregation with the formation of a lyotropic liquid crystal.

The important role of intermolecular links of the hydrogen bond type in the formation of supramolecular polymer compositions was described for example in European Patent EP 1,300,447. Such bonds appear as a result of the interaction between functional groups of adjacent polymer chains.

The U.S. Pat. No. 5,730,900 discloses method of obtaining a film comprising polymer matrix. By the disclosed method an initial solution comprises a discotic substituted polycyclic compound containing polymerizable groups in the substituents, and a liquid-crystalline substance. The substrate is an oriented polymer substrate. After the disclosed treatment and further cooling a film is formed comprising polymer matrix with liquid-crystalline inclusions representing the bound filler. This conversion of a two-component mixture leads to the formation of a matrix-polymer system with protection layers, retaining the liquid-crystalline properties in the final film. However, use of organic solvents, the required individual selection of the solvents for the system components, the required high temperatures and/or UV radiation make the aforementioned polymerization process technologically complicated and not environmentally appropriate.

Another class of compounds for the obtaining of modified optical film materials possessing new properties is offered by modified water-soluble dichroic organic dyes with planar molecular structures. Heterocyclic molecules and molecular aggregates of such compounds are characterized by a strong dichroism in the visible spectral range. The process of manufacturing thin crystal films based on such materials does not have the disadvantages of the technology of the art. The manufacturing process includes the following stages. In the first stage, a water-soluble dye forms a lyotropic liquid crystal phase. This phase comprises columnar aggregates composed of discotic molecules of the dichroic dyes [see for example Yeh, P., et al., Molecular Crystalline Thin Film E-Polarizer, Mol. Mater., 14 (2000)]. These molecules are capable of aggregating even in dilute solutions [see Lydon, J., Chromonics, In: Handbook of Liquid Crystals, 1998, pp. 981-1007]. In the second stage, application of the lyotropic liquid crystal phase (in the form of ink or paste) with shear aligns molecular columns in the direction of shear. High thixotropy of the applied liquid crystal provides high molecular ordering in the shear-induced state and its preservation after termination of the shear action. In the third stage of the process, evaporation of the solvent (water) leads to unidirectional crystallization with the formation of an organic solid crystal film from the pre-oriented liquid crystal phase as generally described in the U.S. Pat. No. 6,563,640. Such Thin Crystal Films (TCFs) are characterized by high optical anisotropy of refraction and absorption indices, exhibit the properties of extraordinary polarizers as described in more details in Bobrov, Yu. A., J. Opt. Tehnol., 66, 547(1999), and are available for commercial application in liquid crystal displays as was generally described in Ignatov, L. et al., Society for Information Display, Int. Symp. Digest of Technical Papers, Long Beach, Calif., May 16-18, Vol. XXXI, 834-838 (2000).

The optical anisotropic film manufactured by this technology is limited in the high-humidity environment. As disclosed in U.S. Pat. No. 6,563,640 the films may be additionally treated with the solution containing ion of bi- or tri-valence metals. As the final product of this treatment the non-soluble film is formed. However, the water content can fluctuate with the elevated temperature and high humidity which results in decrease of stability of the optical characteristics.

SUMMARY OF THE INVENTION

The present invention provides an optically anisotropic composite film material possessing improved working characteristics, including hydrolytic stability and mechanical strength with respect to environmental factors. These and other advantages of the present invention may be achieved by creating a supramolecular composite film material. This supramolecular composite film material comprises a matrix of thin crystal film composed of organic supramolecules containing polar groups, and a binding agent representing a water-soluble aliphatic compound containing at least two functional groups.

The present invention further provides a method for manufacturing supramolecular composite film materials possessing these advantageous properties. In one embodiment, the method comprises the following steps: (i) formation of a layer of lyotropic liquid crystal composed of supramolecules of a cyclic organic compound with conjugated π-systems and substituted polar groups; (ii) application of an external orienting force to said layer and further removal of a solvent with the resulting formation of a thin crystal film; (iii) treatment of the thin crystal film with a solution of inorganic salts leading to the formation of an insoluble crystalline film of supramolecules composed of said organic molecules; (iv) impregnation of said insoluble film with a binding agent capable of interacting with the polar groups with the subsequent formation of a filled film; and (v) drying of said filled film leading to the formation of a supramolecular composite film material.

BRIEF DESCRIPTION OF THE DRAWINGS

Other objects and advantages of the present invention will become apparent upon reading the detailed description of the invention and the appended claims provided below, and upon reference to the drawings, in which:

DETAILED DESCRIPTION OF THE INVENTION

Figure 1:
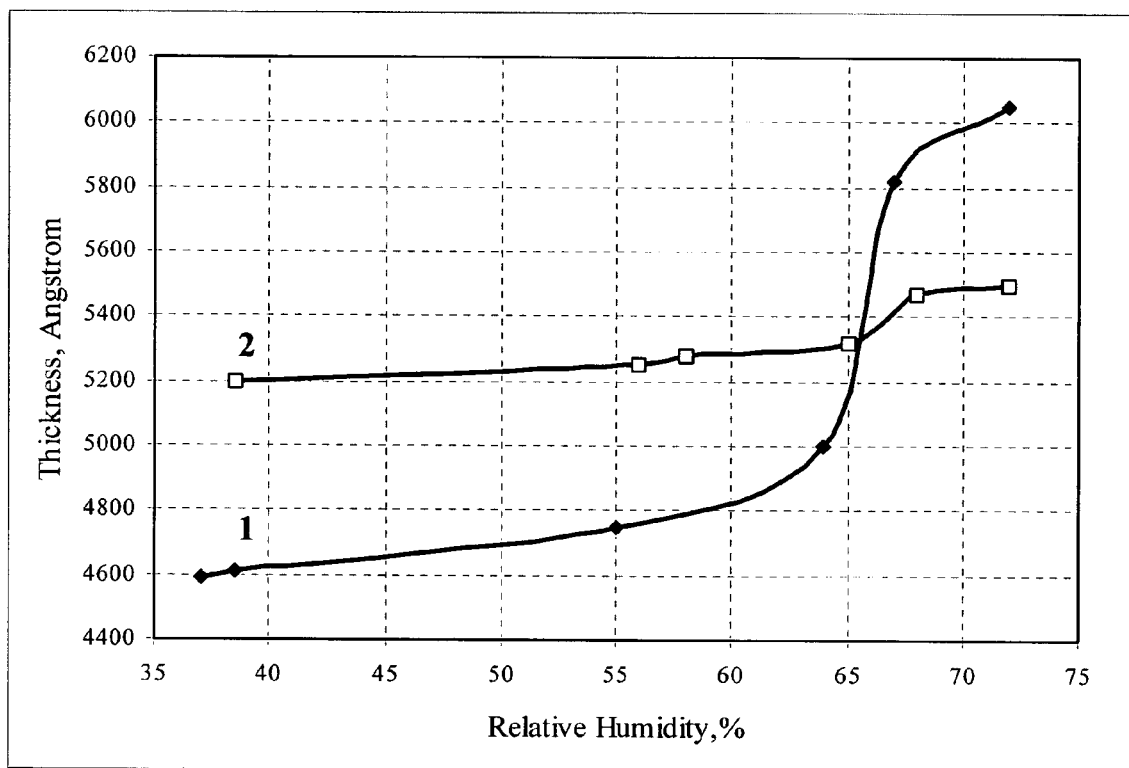
FIG. 1 shows the dependence of the thickness of a supramolecular composite film on the relative humidity for a thin crystal film (TCF) treatment with an inorganic salt and with an impregnating solution of methylol carbamides and glycerol (MCGl). TCF with (curve 2) and without (curve 1) treated of MC(2%)+Gl(1%).

The present invention provides optically anisotropic films of a composite material possessing selective optical properties in a broad wavelength range and a method of obtaining such films. The material can be based on various organic substances capable of forming lyotropic liquid crystal phases in solution. Application of this material onto a substrate, followed by the external orienting force on the lyotropic liquid crystal phases and removal of the solvent, leads to the formation of thin, anisotropic crystalline films comprising ordered systems of organic molecules.

The increased mechanical strength and improved physical properties ensuring proper functioning of the optical films, in particular their stability under the conditions of high temperatures and humidity, are provided by treatment of the films with inorganic salts and water-soluble organic compounds capable of interacting with liquid crystal molecules.

The disclosed optically anisotropic films of a composite material possess higher stability with respect to environmental factors, improved mechanical properties, and better optical characteristics as compared to untreated films. Yet another embodiment of the present invention provides a method for obtaining said films.

The present invention employs supramolecules composed of organic molecules possessing a planar configuration, containing substituted polar groups, and linked by noncovalent π-π bonds. With respect to their chemical structure, these molecules belong to cyclic compounds (including aromatic and heterocyclic ones) with conjugated systems of π bonds. These molecules contain substituted modifying groups, which can be either polar or nonpolar. The polar groups are hydrophilic and provide for the solubility of said molecules of organic compounds in water and other polar solvents. The nonpolar groups are hydrophobic and determine the solubility in nonpolar solvents and the required spectral characteristics. One class of such compounds is offered by organic dyes.

Said supramolecules comprise the chains of cyclic organic molecules with conjugated π-systems linked by π-π (arene-arene) bonds, having the general formula

where M is an organic molecule; n is the number of molecules in the chain (up to 10000), F is a polar group exposed to intersupramolecular space; and d is the number of polar groups per molecule (varying from 1 to 4).

The polar groups can be ionogenic and nonionogenic. Ionogenic polar groups typically represent the anionic groups of strong mineral acids, including sulfonic, sulfate, and phosphate groups, as well as less polar carboxy groups. In addition, these groups may represent cationic fragments such as amino and some amphoteric groups possessing pH-dependent properties. In solution, the polar groups are always accompanied by one or several (like or unlike) counterions. Polyvalent counterions may simultaneously belong to various molecules. Nonionogenic polar groups include hydroxyl, chlorine, bromine, and the like.

The nonpolar groups belong predominantly to numerous classes of organic fragments, such as methyl, ethyl, ethoxy, etc.

The molecules of organic compounds under consideration possess planar configuration, usually of an ellipsoidal shape. These molecules can be either symmetric or asymmetric, with substituents arranged at the periphery. The molecules are amphiphilic and may simultaneously contain substituted groups of either like or unlike chemical nature.

As is known, a driving force for the formation of molecular aggregates or supramolecules is the π-π interaction between planar molecules (e.g., of dyes). The solvation, that is, preferential interaction of the modifying polar groups with the solvent, leads to the formation of an ordered structure of supramolecules of the same type, called lyotropic liquid crystal (LLC) system or mesophase. An LLC system is characterized by a phase diagram with a domain of stability over a broad range of concentrations, temperatures, and pH values.

The formation of such LLC mesophases by the organic substances under consideration in a polar solvent is a condition necessary to achieve the objectives of the disclosed invention. The polar solvent can be water or a mixture of water and an organic solvent miscible with water in any proportion.

The disclosed invention makes use of water-soluble organic substances capable of forming mesophases, which were described in detail in the United States Published Patent application No. US2001/0029638 which is incorporated herein by reference in its entirety, and include but not limited to the following classes of compounds:

polymethine dyes (e.g., pseudoisocyanine, piacyanol);
triarylmethane dyes (e.g., Basic Turquose, Acid Light Blue 3);
diaminoxanthene dyes (e.g., sulforhodamine);
acridine dyes (e.g., Basic Yellow K);
sulfonated acridine dyes (e.g., trans-quinacridone);
water-soluble derivatives of anthraquinone dyes (e.g., Active Light Blue KX);
sulfonated vat dye products (e.g., flavanthrone, Indanthrene Yellow, Vat Yellow 4K, Vat Dark Green G, Vat Violet C, indanthrone, Perylene Violet, Vat Scarlet 2G);
azo dyes (e.g., Benzopurpurin 4B, Direct Lightfast Yellow O);
water-soluble diazine dyes (e.g., Acid Dark Blue 3);
sulfonated dioxazine dye products (pigment Violet Dioxazine);
soluble thiazine dyes (e.g., Methylene Blue);
water-soluble phthalocyanine derivatives (e.g., copper octacarboxyphthalocyanine salts);
fluorescent whiteners;
disodium chromoglycanate;
and some other, including Perylenetetracaboxylic Acid Diimide Red (PADR), benzimidazoles of PADR (violet) and naphthalenetetracarboxylic acid (yellow, claret), sulfoderivatives of benzimidazoles and phenanthro-9,10:2,3-quinoxaline, etc.

Lyotropic liquid crystal mesophase is formed by using ionogenic organic molecules in the form of water-soluble sulfoderivatives, either individually or in mixtures of such compounds.

Cationic counterions in the disclosed systems can be but not limited to H+, NH+4, K+, Li+, Na+, Cs+, $Ca^{2+}$, $Sr^{2+}$, $Mg^{2+}$, $Ba^{2+}$, $Co^{2+}$, $Mn^{2+}$, $Zn^{2+}$, $Cu^{2+}$, $Pb^{2+}$, $Fe^{2+}$, $Ni^{2+}$, $Al^{3+}$, $Ce^{3+}$, $La^{3+}$, etc., as well as mixtures of these and other cations.

When dissolved in water, the molecules of these sulfoderivatives or their mixtures form anisometric (rod-like) aggregates packed as stacked coins. Each aggregate in such a solution represents a micelle with an electric double layer, while the entire solution represents a highly dispersed (colloidal) lyophilic system. As the solution concentration (i.e., micelle concentration) is increased, the anisometric aggregates exhibit spontaneous ordering which is also named self-ordering. This leads to the formation of a nematic lyotropic mesophase, whereby the system becomes liquid-crystalline. The high order of dye molecules in the columns allows their mesophases to be used for obtaining oriented dichroic materials. The films formed from these materials possess a high degree of optical anisotropy. The liquid crystal state is readily verified by usual methods, for example, with the aid of a polarization microscope.

The content of said sulfoderivatives or their mixtures in the LLC mesophase ranges from 3 to 50 mass %, most typically being within 7 to 30 mass %. Said LLC system may additionally contain up to 5 mass % of surfactants and/or plasticizers.

By varying the number of sulfonic groups, typically from one to four, and the number and character of other substituents (such as ethyl, methyl, chlorine, bromine) in the dye molecules, it is possible to control the hydrophilic-hydrophobic balance of aggregates formed in liquid-crystalline solutions and to change the solution viscosity. This, in turn, affects the dimensions and shapes of supramolecules and influences the degree of molecular ordering of these supramolecules, which provides for a required solubility and a high stability of the related LLC systems. The distance between supramolecules is typically within 40-100 Å.

All the aforementioned compounds are capable, both separately and in mixtures with one another or with the other dichroic dyes, as well as with some organic compounds which are colorless or weakly absorbing in the visible spectral range, of forming stable LLC mesophases in solution. After removal of the solvent, these mesophases can form anisotropic, at least partially crystalline films possessing high optical characteristics.

The LLC solution is concentrated by evaporating the solvent, for example, on heating to a relatively low temperature, by distillation in vacuum, or by diafiltration. This treatment may lead to the formation of a paste-like substance or the so-called "ink", capable of retaining the liquid crystal state for a sufficiently long time.

A layer of the LLC system is formed by applying the solution or concentrate onto a clean substrate surface. The substrates are usually made of a glass or a polymer, including but not limited to poly(ethylene terephthalate) (PET), polycarbonate, polyarylates, etc., and can possess any desired shape.

Then, the LLC layer is subjected to orientation. There are known methods of the external orienting force, which are based on the use of various factors: mechanical, electrical, magnetic, etc. The intensity of this force, which must be sufficient to provide for a required orientation to the kinetic units (supramolecules) of the LLC mesophase, depends on the properties of the liquid-crystalline solution, such as its nature, concentration, temperature, etc. The resulting oriented structure is a basic property of the disclosed material and related articles made of this material. Further description is found in U.S. Pat. Nos. 5,739,296; 6,174,394; and 6,563,640 which are incorporated herein by reference in their entirety.

According to the disclosed invention, the external orienting force upon the layer of a lyotropic liquid crystal system of organic molecules is produced by mechanical shear. This is achieved through directed mechanical motion of one or several alignment devices of various types, including a knife, a cylindrical wiper, or a flat plate, oriented parallel to the applied layer surface or at an angle to this surface, a slot die or any other alignment devices. A distance from the surface to the edge of the alignment tool is set so as to obtain a film of required thickness.

The subsequent process of solvent removal is performed under mild conditions at room temperature for a time period up to approximately 1 hour, or by heating in the temperature range from approximately 20 to 60° C. for the sake of time saving, and at a relative humidity of 40-70%. This treatment leaves the substrate covered by an oriented thin layer of the organic supramolecules, called thin crystal film (TCF).

The regime of solvent removal is selected so as to exclude the possibility of impairing orientation of the previously formed LLC structure, while providing for the relaxation of stresses arising in the course of the external orienting force. Care should be taken to avoid over-drying of the LLC layer prior to the TCF formation on the substrate surface. It is recommended to perform the solvent removal stage under conditions of elevated humidity. Critical factors ensuring a high degree of crystallinity of the material layer are the rate and the directional character of the process of solvent removal from the system. The resulting layer represents a sufficiently thin continuous film possessing an ordered molecular structure, in which organic molecules are aggregated in orientation-ordered ensembles. The formation of this structure is determined by a special liquid-crystalline state of molecules in solution, in which they already possess a local order, entering into one- and/or two-dimensional mutually oriented quasicrystalline aggregates. Applied onto a substrate surface, with simultaneous application of the external orienting force, such a system acquires macroscopic orientation. This orientation is not only retained in the course of drying, but may even increase due to crystallization.

The subsequent compulsory stage according to the disclosed process is the treatment of the obtained TCF of supramolecules with an aqueous solution of mineral salts in order to convert the film into an insoluble form. For this purpose, it is possible to use, for example, a solution of barium chloride ($BaCl_2$) with a concentration in the range from 5 to 30%, the optimum interval being 10-20%. During the treatment, $Ba^{2+}$ ions are replaced with $NH_4^+$ ions (counterions to the polar groups of supramolecules) with the formation of insoluble organic barium sulfates. Unreacted barium sulfate, which can partially penetrate into pores and structural defects of the film, is subsequently removed by washing in water. Then, the film is dried in air at room temperature or at an elevated temperature in the range from 20 to 70° C. for up to approximately 20 min depending on the temperature.

The next stage in the disclosed technological cycle consists in the impregnation of insoluble TCFs with a solution of a water-soluble organic binding agent capable of, first, rapidly interacting with sulfonic and other polar groups of organic molecules exposed to the intersupramolecular space, and second, forming crosslinks.

The binding agent is selected from the class of aliphatic compounds including methylol carbamides (MCs), for example, monomethylol carbamide ($H_2N(CO)NHCH_2OH$) and dimethylol carbamide ($HOH_2CHN(CO)NHCH_2OH$) obtained by interaction of carbamide ($NH_2CONH_2$) with formaldehyde (HCHO). The MC molecules are capable of polymerizing with one another via interaction of their functional amino and hydroxy groups. This results in the formation of macromolecules of various lengths, from dimmers and trimers to oligomers and high-molecular-mass compounds with the degree of polymerization around or above 100 with a chain length exceeding the distance between stacks in macromolecules.

When a monomer solution is applied onto the TCF surface, MC molecules diffuse into the film and spread between the stacks. Depending on a particular site and concentration in the film, molecules of the binding agent exhibit various transformations. These molecules form chemical bonds of ether ionic or hydrogen type with each other or with polar groups of organic dye molecules.

The MC polycondensation proceeds at pH <5 and is catalyzed by various acids. The process can be accelerated through heating. The reaction is described by the following scheme:

—$NHCH_2OH+HOCH_2NH$→
—$NHCH_2OCH_2NH$— +$H_2O$

—$NHCH_2OH+HOCH_2NH$→
—$NHCH_2NH$— +$H_2O$ +$CH_2O$

Depending on their length and conformation, the polymerized MC molecules bind separate structural fragments of TCF (formed by crystallized organic supramolecules) belonging either to the same supramolecule or to different supramolecules. The MC molecules can polymerize with crosslinking both in the volume of TCF and on the surface, creating a thin solid composite film. The final film thickness depends on the initial TCF layer thickness and on the MC solution concentration. The TCF obtained as a result of impregnation possesses sufficiently high strength and elasticity. The network of crosslinks binds the stacks of dye molecules, thus reinforcing the TCF structure.

If the impregnating solution contains only MC molecules, a polymer film formed on the TCF surface is rigid, brittle, and can lose transparency with time. In order to obtain stable and elastic films, it is recommended to introduce alcohols with two or more OH groups into the impregnating solution. The most appropriate additive is glycerol (Gl) or other di- and polyatomic alcohols, which is capable of copolymerizing with MC and forming crosslinks between amino groups and, in addition, produces a plasticizing action. Moreover, the introduction of glycerol into the impregnating MC solution significantly (by 15-20%) improves the optical characteristics of TCFs. The impregnation with MC+Gl solutions and the formation of thin surface polymer films significantly increases the environmental stability of TCFs. The optimum ratio of MC and Gl in the impregnating solution is 2:(0.1-1.0) (w/w). This process is performed, for example, by dipping a sample into a low-concentration aqueous solution of MC or a mixture of MC with an alcohol (two- or three-atomic) for a time from one to several tens of seconds. Finally, the modified film is dried at room temperature or at an elevated temperature in the range from 20 to 700 C during a time period of 1-20 min (or by alternating these regimes). The drying is accompanied by elimination of the excess binding agent from the TCF surface and from supramolecular organic structures.

The observed increase in the optical characteristics and thermal stability of TCFs treated with MC+Gl solutions is explained primarily by binding of the dye fragments into a unified system by MC and Gl molecules. This can be related both with (i) the formation of hydrogen bonds between the hydroxy groups of MC and Gl and the carbonyl and sulfo-groups of the dye and (ii) the interactions between the amino groups of MC and the sulfo-groups of the dye. In addition, MC molecules may exhibit polymerization at pH <5-6 with the formation of a spatial network of their own. The molecules of Gl may enter into the reaction of polycondensation with MC. As a result, there appears a TCF based composite material with MC and Gl playing the role of binding agents. This composite exhibits increased strength, which is confirmed by the constancy of the thickness of (MC+Gl)-treated TCFs under the conditions of increased humidity. As can be seen from the data presented in FIG. 1, the thickness of control (untreated) TCF samples depends on the relative humidity (RH) of air, exhibiting especially pronounced variations in the region of RH≧60-70%. On the whole, the thickness of untreated TCFs in te RH interval studied increases by ~32%. After the impregnation with a 2% MC-1% Gl solution, the thickness of samples increases approximately by 13%, but it becomes much less dependent on the relative humidity. In one test, the thickness of an impregnated TCF, which was 520 nm at RH=37%, increased only by 30 nm (5.7%) at RH=72%.

The above sequence of stages provides a solid composite film characterized by high strength and thermal stability. In this composite, the products of chemical conversion of the organic compounds play the role of fillers, while the TCF film of supramolecular organic compounds impregnated with inorganic salts serves as the matrix. The TCF film containing polar groups accounts for up to 95 mass % of the total material weight. The material is highly stable with respect to environmental factors such as high temperatures, withstanding a short-time (within 30 min) heating up to 230° C. The optical characteristics of the films are retained during long-term operation under conditions of increased humidity (RH=95%) and elevated temperatures (up to 80° C.).

In all cases described above, the resulting films are crystalline, with an interplanar spacing on the order of 3.4 Å. The films are birefringent and exhibit dichroic, polarizing, and phase-shifting (retarding) properties related to the difference in refractive indices in the mutually perpendicular directions relative to the optical axis. The film can also possess the properties of an optical filter. Moreover, the films may combine the aforementioned properties, together with improved mechanical characteristics, and can perform the corresponding working functions.

EXPERIMENTAL

Experiments were conducted according the method and system of the present invention. These examples are intended for illustration purposes only, and are not intended to limit the scope of the present invention in any way.

Example 1

A supramolecular composite film material was prepared as follows. An aqueous solution of the mixture of organic compound including sulfonated derivatives of indanthrone, naphthalenetetracarboxylic acid and perylenetetracarboxylic acid (INP) with a total concentration of 5% was evaporated using a rotor evaporator to a dye concentration (10-16%) ensuring the formation of a lyotropic liquid crystal phase. Then, surfactant Triton X-100 was added into the solution in order to improve wetting of the substrate surface. The resulting working concentration of the "black" ink was 13%.

The ink was applied onto the surface of a glass substrate with simultaneous orientation using a Mayer rod as the aligning instrument. The film application was performed at 20° C. and RH=65-70%. After drying under the same conditions, the TCF was converted into the water-insoluble form (Ba-form) by dipping for 1-2 s into a 10% aqueous solution of barium chloride ($BaCl_2$). Then, the sample was lifted up in a vertical position, washed with deionized (DI) water and dried with air knife.

The composite film material exhibited anisotropic optical properties. The polarizing parameters and color coordinates of TCF (control samples) are presented in FIG. 1 and Table 1. The measurements were performed in air at room temperature and a relative humidity RH=45%.

TABLE 1

Polarizing parameters and color coordinates of TCFs based on <<black>> ink measured (control samples) before baking.

| | Transmittance, % | | | | | | | Color coordinates | | | | | |
| --- | --- | --- | --- | --- | --- | --- | --- | --- | --- | --- | --- | --- | --- |
| | | | | | | | | Single | | Two parallel | | Two crossed | |
| # | T | H0 | H90 | Ep | CR | Δ(CR) | Kd | A | B | a | B | A | b |
| 1 | 42.9 | 32.8 | 4.0 | 88.3 | 8.1 | 0.1 | 14.1 | 1.21 | −4.58 | −2.10 | 1.31 | 14.06 | −31.25 |
| 2 | 40.8 | 31.0 | 2.4 | 92.6 | 13.0 | 0.2 | 14.6 | 0.81 | −3.95 | −2.37 | 1.25 | 15.28 | −33.02 |
| 3 | 39.1 | 29.4 | 1.1 | 96.3 | 26.6 | 0.4 | 16.0 | −0.56 | −1.53 | −3.89 | 3.40 | 15.73 | −32.57 |
| 4 | 35.8 | 25.3 | 0.3 | 98.9 | 90.3 | 4.6 | 16.3 | −2.08 | 1.01 | −4.87 | 4.54 | 14.13 | −27.84 |

Here and below, T is the transmittance of a single sample in nonpolarized light; H0 and H90 are the transmittances of two parallel and two crossed polarizers, respectively, in nonpolarized light; EP is the polarizing efficiency; CR is the contrast ratio; and Kd is the dichroic ratio.

In order to increase the thermal stability and improve the optical properties of TCFs, the samplers were impregnated by dipping for 30 s into a 10% MC solution at 20° C., followed by rinsing in DI water and drying with air knife. The optical characteristics of TCFs after impregnation and drying are presented in Table 2.

TABLE 2

Polarizing parameters and color coordinates of TCF, based on <<black>> ink measured before baking (Samples were dipped in 10% MC solution, washed in DI water, and dried with compressed air)

| | Transmittance, % | | | | | | | Color coordinates | | | | | |
|---|---|---|---|---|---|---|---|---|---|---|---|---|---|
| | | | | | | | | Single | | Two parallel | | Two crossed | |
| # | T | H0 | H90 | Ep | CR | Δ(CR) | Kd | a | b | a | b | a | b |
| 5 | 42.8 | 32.9 | 3.8 | 89.0 | 8.6 | 0.1 | 14.4 | 1.20 | −4.31 | −2.12 | 1.43 | 14.38 | −30.69 |
| 6 | 41.4 | 31.8 | 2.5 | 92.5 | 12.8 | 0.2 | 15.3 | 0.30 | −3.02 | −3.30 | 2.56 | 14.87 | −30.83 |
| 7 | 39.3 | 29.8 | 1.1 | 96.3 | 26.6 | 0.4 | 16.4 | −0.40 | −1.31 | −3.58 | 3.60 | 15.58 | −31.57 |
| 8 | 36.8 | 26.8 | 0.4 | 98.6 | 71.2 | 2.8 | 16.9 | −1.85 | 1.08 | −4.62 | 4.78 | 13.20 | −25.62 |

Then, the control and MC-impregnated TCF samples were subjected to heating at 230° C. or 20 min (baking test). The optical characteristics of TCFs after baking are presented in Table 3.

TABLE 3

Polarizing parameters and color coordinates of TCFs based on <<black>> ink measured after baking

| | Transmittance, % | | | | | | | Color coordinates | | | | | |
|---|---|---|---|---|---|---|---|---|---|---|---|---|---|
| | | | | | | | | Single | | Two parallel | | Two crossed | |
| # | T | H0 | H90 | Ep | CR | Δ(CR) | Kd | a | b | a | B | A | b |
| Control | | | | | | | | | | | | | |
| 1 | 42.0 | 30.3 | 5.1 | 84.4 | 5.9 | 0.1 | 10.7 | 0.71 | −3.75 | −2.04 | 1.16 | 9.26 | −22.05 |
| 2 | 39.5 | 28.2 | 3.0 | 89.8 | 9.3 | 0.1 | 11.1 | 0.57 | −3.24 | −1.99 | 1.20 | 10.15 | −23.22 |
| 3 | 37.0 | 25.9 | 1.5 | 94.2 | 16.9 | 0.2 | 11.7 | −0.48 | −1.51 | −3.17 | 2.67 | 10.21 | −22.46 |
| 4 | 33.0 | 21.3 | 0.4 | 98.1 | 53.5 | 1.6 | 12.0 | −1.76 | 0.84 | −3.94 | 3.83 | 8.83 | −18.54 |
| Samples dipped in 10% MC solution | | | | | | | | | | | | | |
| 5 | 43.2 | 32.7 | 4.5 | 87.0 | 7.2 | 0.1 | 13.5 | 0.71 | −3.54 | −2.43 | 1.89 | 11.27 | −25.18 |
| 6 | 40.8 | 30.5 | 2.7 | 91.5 | 11.2 | 0.1 | 13.6 | 0.44 | −3.22 | −2.72 | 2.04 | 12.88 | −28.35 |
| 7 | 38.2 | 27.7 | 1.4 | 95.0 | 19.4 | 0.3 | 13.4 | −0.60 | −1.74 | −3.72 | 2.86 | 12.53 | −26.99 |
| 8 | 35.2 | 24.4 | 0.4 | 98.4 | 62.3 | 2.2 | 14.4 | −1.73 | 0.75 | −4.28 | 4.21 | 11.89 | −24.00 |

Figure 2:
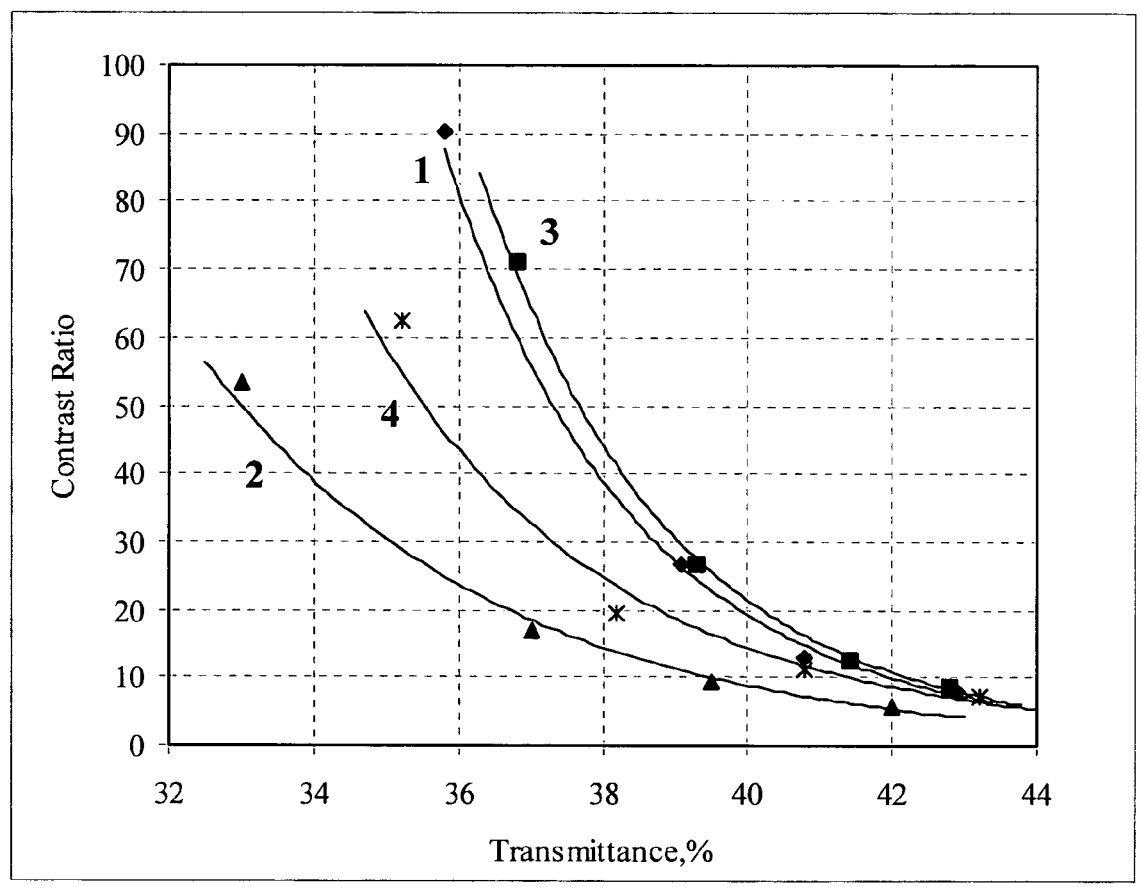
FIG. 2 shows the contrast ratio versus transmission (CR-T curve) for an insoluble TCF of sulfonated derivatives of indanthrone, naphthalenetetracarboxylic acid and perylenetetracarboxylic acid (INP) with and without treatment with an impregnating solution of methylol carbamides (MC) before and after the baking test at 230° C. Non-treated TCF before (1) and after (2) the baking test, TCF treated with 10%-MC solution before (3) and after (4) the baking test.

The plots of contrast versus transmission for the untreated (control) TCFs and the MC-impregnated samples before and after baking are presented in FIG. 2.

Example 2

The samples of TCFs on glass substrates were prepared from 11.5% ink using a Mayer rod as the aligning instrument. The ink was applied at 20° C. and RH=65-70%. After drying under the same conditions, the TCF was converted into the water-insoluble form (Ba-form) by dipping for 1-2 s into a 10% aqueous solution of barium chloride (BaCl$_2$). Then, the sample was lifted up in a vertical position, washed with DI water and dried with air knife.

The optical characteristics of these TCFs (control samples) measured in air at room temperature and a relative humidity RH=45% are presented in Table 4.

TABLE 4

Polarizing parameters and color coordinates of TCF based on 11.5% ink (control samples) measured before baking

| | Transmittance, % | | | | | | | Color coordinates | | | | | |
|---|---|---|---|---|---|---|---|---|---|---|---|---|---|
| | | | | | | | | Single | | Two parallel | | Two crossed | |
| # | T | H0 | H90 | Ep | CR | Δ(CR) | Kd | a | b | a | b | A | b |
| 1 | 41.6 | 31.3 | 3.3 | 89.8 | 9.4 | 0.1 | 13.4 | 1.09 | −3.94 | −2.07 | 1.65 | 13.86 | −29.81 |
| 2 | 40.0 | 30.2 | 1.7 | 94.4 | 17.4 | 0.2 | 15.1 | −0.10 | −2.36 | −3.54 | 3.07 | 14.99 | −31.92 |
| 3 | 38.9 | 29.0 | 1.2 | 95.9 | 24.1 | 0.4 | 15.2 | −0.30 | −1.48 | −3.37 | 3.42 | 14.79 | −30.56 |
| 4 | 38.4 | 28.4 | 1.0 | 96.5 | 27.8 | 0.5 | 15.2 | −0.07 | −1.55 | −2.88 | 3.06 | 15.40 | −31.46 |
| 5 | 36.4 | 26.0 | 0.4 | 98.4 | 62.8 | 2.2 | 15.8 | −1.73 | 0.49 | −4.64 | 4.35 | 14.36 | −28.44 |

In order to increase the thermal stability and improve the optical properties of TCFs, the samples were treated by dipping for 30 s into various MC+Gl (2:1) solutions at 200 C, followed by rinsing in DI water and drying with air knife. This treatment significantly improved the hardness of TCFs. The optical characteristics of TCFs after impregnation and drying are resented in Table 5.

TABLE 5

Polarizing parameters and color coordinates of TCF based on 11.5% ink measured before baking

|   |   | Transmittance, % |   |   |   |   |   | Single | | Two parallel | | Two crossed | |
|---|---|---|---|---|---|---|---|---|---|---|---|---|---|
| # | T | H0 | H90 | Ep | CR | Δ(CR) | Kd | a | b | a | b | A | b |
| Impregnation by 2% MC + 1% Gl solution ||||||||||||||
| 6 | 42.4 | 32.8 | 3.2 | 90.8 | 10.3 | 0.1 | 15.3 | 0.66 | −3.95 | −2.84 | 1.85 | 14.49 | −32.07 |
| 7 | 40.6 | 31.3 | 1.7 | 94.7 | 18.5 | 0.2 | 16.4 | 0.04 | −2.29 | −3.40 | 3.43 | 15.91 | −34.08 |
| 8 | 39.3 | 29.9 | 1.0 | 96.6 | 29.3 | 0.5 | 16.8 | −0.40 | −1.31 | −3.57 | 3.77 | 16.30 | −33.96 |
| 9 | 39.4 | 30.0 | 1.1 | 96.4 | 27.6 | 0.4 | 16.7 | −0.38 | −1.22 | −3.53 | 3.88 | 15.82 | −32.75 |
| 10 | 36.5 | 26.3 | 0.3 | 98.9 | 89.2 | 4.5 | 17.1 | −1.87 | 1.19 | −4.62 | 5.01 | 14.86 | −29.07 |
| Impregnation by 4% MC + 2% Gl solution ||||||||||||||
| 11 | 42.8 | 33.4 | 3.3 | 90.6 | 10.2 | 0.1 | 15.9 | 0.73 | −4.06 | −2.83 | 1.84 | 14.83 | −32.77 |
| 12 | 41.1 | 31.9 | 1.8 | 94.6 | 17.9 | 0.2 | 16.9 | 0.17 | −2.39 | −3.24 | 3.42 | 16.05 | −34.49 |
| 13 | 39.6 | 30.3 | 1.1 | 96.3 | 26.4 | 0.4 | 16.8 | −0.24 | −1.60 | −3.45 | 3.62 | 16.34 | −34.40 |
| 14 | 39.7 | 30.5 | 1.0 | 96.6 | 29.1 | 0.5 | 17.4 | −0.63 | −1.26 | −4.03 | 3.87 | 16.54 | −33.98 |
| 15 | 38.6 | 29.1 | 0.7 | 97.7 | 43.6 | 1.1 | 17.5 | −1.24 | −0.20 | −4.49 | 4.47 | 16.12 | −32.46 |
| Impregnation by 6% MC + 3% Gl solution ||||||||||||||
| 16 | 43.2 | 33.5 | 3.8 | 89.1 | 8.7 | 0.1 | 15.1 | 0.99 | −4.35 | −2.49 | 1.91 | 14.43 | −32.67 |
| 17 | 41.0 | 31.8 | 1.9 | 94.3 | 17.0 | 0.2 | 16.5 | 0.27 | −2.60 | −3.10 | 3.16 | 15.94 | −34.23 |
| 18 | 39.1 | 29.6 | 1.0 | 96.5 | 28.2 | 0.5 | 16.4 | −0.59 | −0.87 | −3.92 | 4.66 | 16.02 | −33.72 |
| 19 | 39.5 | 30.1 | 1.0 | 96.7 | 29.7 | 0.5 | 17.1 | −0.77 | −1.22 | −4.25 | 3.92 | 16.53 | −34.19 |
| 20 | 39.2 | 29.9 | 0.9 | 97.1 | 34.5 | 0.7 | 17.4 | −0.79 | −0.85 | −4.12 | 4.34 | 16.84 | −35.20 |

Then, the control and (MC+Gl)-impregnated TCF samples were subjected to heating at 230° C. for 20 min (baking test). The optical characteristics of TCFs after baking are presented in Table 6.

TABLE 6

Polarizing parameters and color coordinates of TCF based on 11.5% ink measured after baking

|   |   | Transmittance, % |   |   |   |   |   | Single | | Two parallel | | Two crossed | |
|---|---|---|---|---|---|---|---|---|---|---|---|---|---|
| # | T | H0 | H90 | Ep | CR | Δ(CR) | Kd | A | b | a | b | A | b |
| Control ||||||||||||||
| 1 | 41.6 | 30.4 | 4.2 | 87.1 | 7.3 | 0.1 | 11.7 | 0.86 | −2.91 | −1.91 | 2.29 | 10.38 | −22.38 |
| 2 | 39.8 | 29.4 | 2.3 | 92.5 | 12.9 | 0.2 | 13.2 | −0.18 | −1.42 | −3.10 | 3.62 | 10.55 | −22.94 |
| 3 | 38.4 | 28.1 | 1.5 | 94.9 | 19.2 | 0.2 | 13.6 | −0.48 | −0.50 | −3.19 | 4.16 | 10.83 | −22.56 |
| 4 | 37.7 | 27.0 | 1.4 | 95.1 | 19.9 | 0.3 | 13.0 | −0.18 | −0.82 | −2.64 | 3.58 | 10.98 | −22.98 |
| 5 | 36.0 | 25.4 | 0.6 | 97.8 | 45.7 | 1.2 | 14.3 | −1.70 | 1.36 | −4.24 | 5.21 | 9.90 | −20.23 |
| Impregnation by 2% MC + 1% Gl solution ||||||||||||||
| 6 | 42.2 | 32.1 | 3.6 | 89.5 | 9.0 | 0.1 | 13.9 | 0.88 | −3.91 | −2.27 | 1.61 | 13.06 | −29.06 |
| 7 | 39.9 | 30.0 | 1.8 | 94.0 | 16.3 | 0.2 | 14.6 | −0.05 | −2.01 | −3.32 | 3.50 | 13.83 | −29.87 |
| 8 | 38.7 | 28.8 | 1.1 | 96.1 | 25.3 | 0.4 | 15.2 | −0.53 | −1.00 | −3.60 | 3.99 | 14.10 | −29.75 |
| 9 | 38.8 | 29.0 | 1.2 | 95.9 | 24.1 | 0.4 | 15.2 | −0.49 | −0.92 | −3.52 | 4.07 | 13.71 | −28.65 |
| 10 | 36.1 | 25.6 | 0.6 | 97.9 | 46.0 | 1.2 | 14.5 | −1.44 | 0.60 | −4.17 | 4.70 | 12.48 | −25.46 |
| Impregnation by 4% MC + 2% Gl solution ||||||||||||||
| 11 | 42.5 | 32.5 | 3.6 | 89.4 | 8.9 | 0.1 | 14.3 | 0.71 | −3.42 | −2.51 | 2.26 | 12.61 | −27.85 |
| 12 | 40.6 | 31.0 | 2.0 | 93.8 | 15.6 | 0.2 | 15.4 | −0.10 | −1.94 | −3.48 | 3.79 | 13.78 | −30.01 |
| 13 | 39.6 | 30.1 | 1.3 | 95.7 | 22.5 | 0.3 | 16.0 | −0.36 | −1.10 | −3.42 | 4.09 | 13.83 | −29.49 |
| 14 | 39.5 | 29.9 | 1.2 | 96.1 | 25.0 | 0.4 | 16.2 | −0.69 | −0.68 | −3.87 | 4.37 | 13.80 | −28.58 |
| 15 | 38.3 | 28.5 | 0.8 | 97.2 | 35.2 | 0.7 | 16.2 | −1.49 | 0.45 | −4.70 | 5.20 | 13.01 | −26.56 |

TABLE 6-continued

Polarizing parameters and color coordinates of TCF based on 11.5% ink measured after baking

| # | Transmittance, % | | | Ep | CR | Δ(CR) | Kd | Color coordinates | | | | | |
|---|---|---|---|---|---|---|---|---|---|---|---|---|---|
| | | | | | | | | Single | | Two parallel | | Two crossed | |
| | T | H0 | H90 | | | | | A | b | a | b | A | b |
| Impregnation by 6% MC + 3% Gl solution | | | | | | | | | | | | | |
| 16 | 42.5 | 32.5 | 3.6 | 89.4 | 9.0 | 0.1 | 14.3 | 0.78 | −3.59 | −2.51 | 2.44 | 13.10 | −29.56 |
| 17 | 40.6 | 30.9 | 2.1 | 93.5 | 14.9 | 0.2 | 15.1 | −0.07 | −2.11 | −3.48 | 3.63 | 13.75 | −29.99 |
| 18 | 39.1 | 29.4 | 1.2 | 96.1 | 24.9 | 0.4 | 15.7 | −0.69 | −0.68 | −3.93 | 4.70 | 14.10 | −30.15 |
| 9 | 39.0 | 29.2 | 1.2 | 96.0 | 24.8 | 0.4 | 15.5 | −0.78 | −0.96 | −4.10 | 4.14 | 14.19 | −29.81 |
| 20 | 38.0 | 28.2 | 0.8 | 97.3 | 36.4 | 0.7 | 15.9 | −1.23 | 0.13 | −4.39 | 5.01 | 14.16 | −29.35 |

Figure 3:
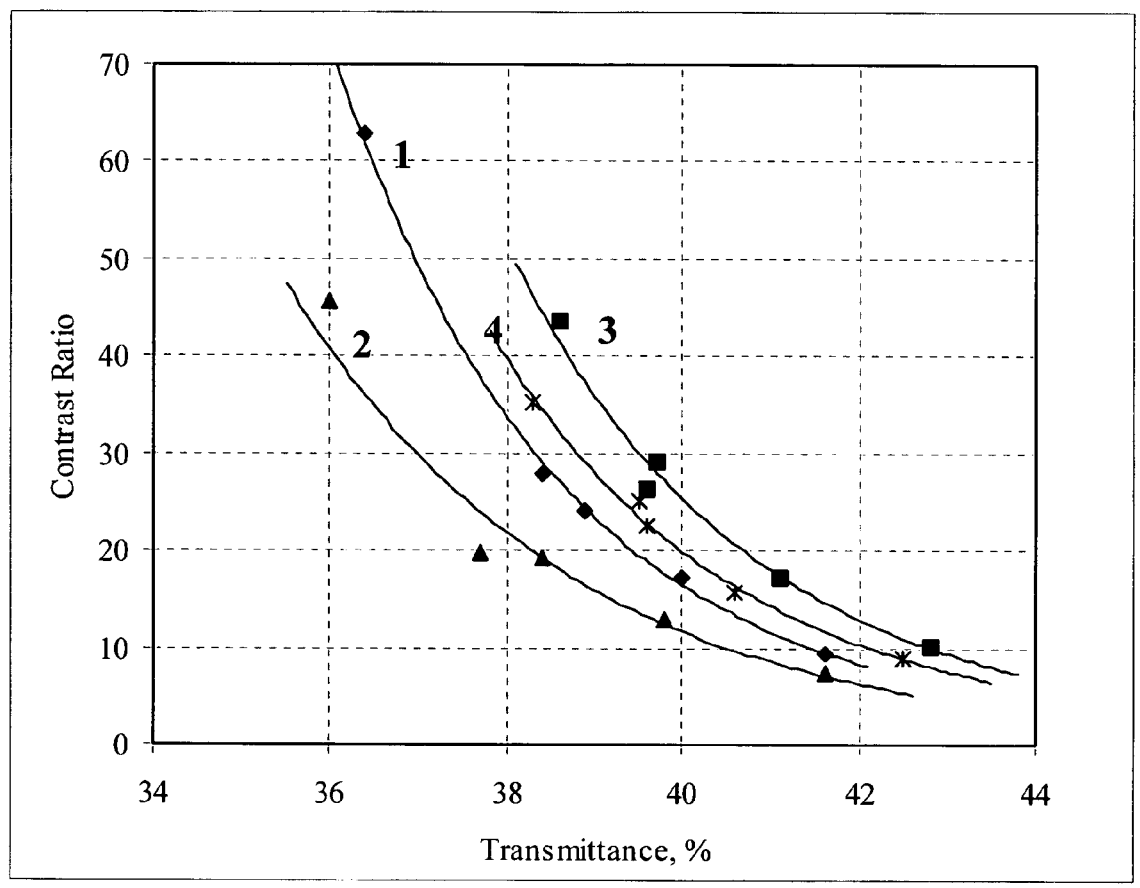
FIG. 3 shows CR-T curves for an insoluble TCF of INP with and without treatment with an impregnating solution of MCGl before and after the baking test at 230° C. Non-treated TCF before (1) and after (2) the baking test, TCF treated with MC(4%)+Gl(2%) solution before (3) and after (4) the baking test.

Data for the control samples and those impregnated with a 4% MC+2% Gl solution before and after the baking test are presented in FIG. 3.

Example 3

The samples of TCFs on glass substrates were prepared from 12% ink using a Mayer rod as the aligning instrument. The ink was applied at 20° C. and RH=65-70%. After drying under the same conditions, the TCF was converted into the water-insoluble form (Ba-form) by dipping for 1-2 s into a 10% aqueous solution of barium chloride ($BaCl_2$). Then, the sample was lifted up in a vertical position, washed with DI water and dried with air knife.

The optical characteristics of these TCFs (control samples) measured in air at room temperature and a relative humidity RH=45% are presented in Table 7.

TABLE 7

Polarizing parameters and color coordinates of TCF based on 12% ink (control samples) measured before environmental test

| # | Transmittance, % | | | Ep | CR | Δ(CR) | Kd | Color coordinates | | | | | |
|---|---|---|---|---|---|---|---|---|---|---|---|---|---|
| | | | | | | | | Single | | Two parallel | | Two crossed | |
| | T | H0 | H90 | | | | | a | b | A | b | A | b |
| 1 | 40.8 | 30.7 | 2.5 | 92.0 | 12.1 | 0.1 | 14.0 | 0.47 | −3.28 | −2.52 | 1.78 | 12.84 | −28.90 |
| 2 | 40.8 | 31.0 | 2.3 | 92.9 | 13.7 | 0.2 | 14.8 | 0.07 | −2.82 | −3.12 | 2.34 | 12.96 | −29.27 |
| 3 | 38.0 | 28.1 | 0.8 | 97.2 | 34.6 | 0.7 | 15.7 | −0.73 | −0.53 | −3.49 | 3.92 | 13.74 | −29.11 |
| 4 | 37.3 | 27.3 | 0.6 | 97.9 | 46.1 | 1.2 | 15.9 | −1.30 | 0.21 | −4.14 | 4.44 | 13.58 | −28.29 |

In order to increase the environmental stability of TCFs, the samples were treated by dipping for 30 s into a 2.5% MC+1.25% Gl solution at 20° C., followed by rinsing in DI water and drying with air knife. This impregnation significantly improved the hardness of TCFs. The optical characteristics of TCFs after impregnation and drying are presented in Table 8.

TABLE 8

Polarizing parameters and color coordinates of impregnated TCFs based on 12% ink measured before environmental test: samples were dipped in 2.5% MC + 1.25% Gl solution

| # | Transmittance, % | | | Ep | CR | Δ(CR) | Kd | Color coordinates | | | | | |
|---|---|---|---|---|---|---|---|---|---|---|---|---|---|
| | | | | | | | | Single | | Two parallel | | Two crossed | |
| | T | H0 | H90 | | | | | a | b | A | b | A | b |
| 5 | 42.1 | 32.8 | 2.6 | 92.3 | 12.4 | 0.1 | 16.1 | 0.24 | −3.13 | −3.15 | 2.60 | 13.86 | −31.50 |
| 6 | 40.9 | 31.9 | 1.6 | 95.0 | 19.6 | 0.3 | 17.3 | −0.22 | −1.89 | −3.54 | 3.60 | 14.77 | −32.38 |
| 7 | 39.4 | 30.2 | 0.8 | 97.4 | 38.6 | 0.8 | 18.2 | −1.07 | −0.37 | −4.28 | 4.44 | 15.49 | −32.36 |
| 8 | 38.5 | 29.0 | 0.6 | 98.0 | 49.2 | 1.3 | 17.9 | −1.47 | 0.22 | −4.62 | 4.73 | 15.07 | −31.03 |

Then, the control and (MC+Gl)-impregnated TCF samples were subjected to heating at 80° C. and a relative humidity of RH=90% for 24 h (environmental test). The optical characteristics of TCFs after this test are presented in Table 9.

samples were treated by dipping for 30 s into a 2.5% MC+1.25% Gl solution at 20° C., followed by rinsing in DI water and drying with air knife. This treatment significantly improved the hardness of TCFs. The optical characteristics of

TABLE 9

Polarizing parameters and color coordinates of TCF based on 12% ink after environmental test.

| | Transmittance, % | | | | | | Color coordinates | | | | | |
|---|---|---|---|---|---|---|---|---|---|---|---|---|
| | | | | | | | Single | | Two parallel | | Two crossed | |
| # | T | H0 | H90 | Ep | CR | Δ(CR) | Kd | A | b | A | B | A | b |
| | | | | | | Control TCF | | | | | | | |
| 1 | 40.3 | 29.2 | 3.3 | 89.3 | 8.9 | 0.1 | 11.7 | −0.75 | −3.28 | −3.35 | 2.66 | 6.65 | −27.42 |
| 2 | 39.8 | 28.8 | 2.9 | 90.4 | 9.9 | 0.1 | 11.8 | −0.87 | −2.71 | −3.53 | 3.16 | 6.76 | −26.63 |
| 3 | 34.5 | 23.1 | 0.8 | 96.7 | 30.2 | 0.5 | 11.6 | −1.69 | 0.83 | −4.32 | 5.87 | 8.80 | −25.09 |
| 4 | 33.0 | 21.3 | 0.5 | 97.8 | 44.2 | 1.1 | 11.5 | −2.10 | 1.74 | −4.70 | 6.43 | 9.37 | −24.82 |
| | | | | Impregnation by 2.5% MC + 1.25% Gl solution | | | | | | | | | |
| 5 | 41.2 | 30.8 | 3.1 | 90.2 | 9.8 | 0.1 | 13.2 | −0.66 | −3.64 | −3.58 | 3.06 | 8.29 | −32.55 |
| 6 | 39.7 | 29.5 | 2.0 | 93.4 | 14.7 | 0.2 | 13.8 | −1.16 | −2.21 | −4.40 | 4.23 | 9.51 | −32.53 |
| 7 | 37.7 | 27.4 | 1.0 | 96.4 | 27.6 | 0.4 | 14.3 | −1.74 | −0.43 | −5.06 | 5.29 | 11.21 | −32.21 |
| 8 | 36.6 | 26.0 | 0.7 | 97.2 | 34.8 | 0.7 | 14.0 | −2.00 | 0.17 | −5.26 | 5.48 | 11.41 | −31.05 |

Figure 4:
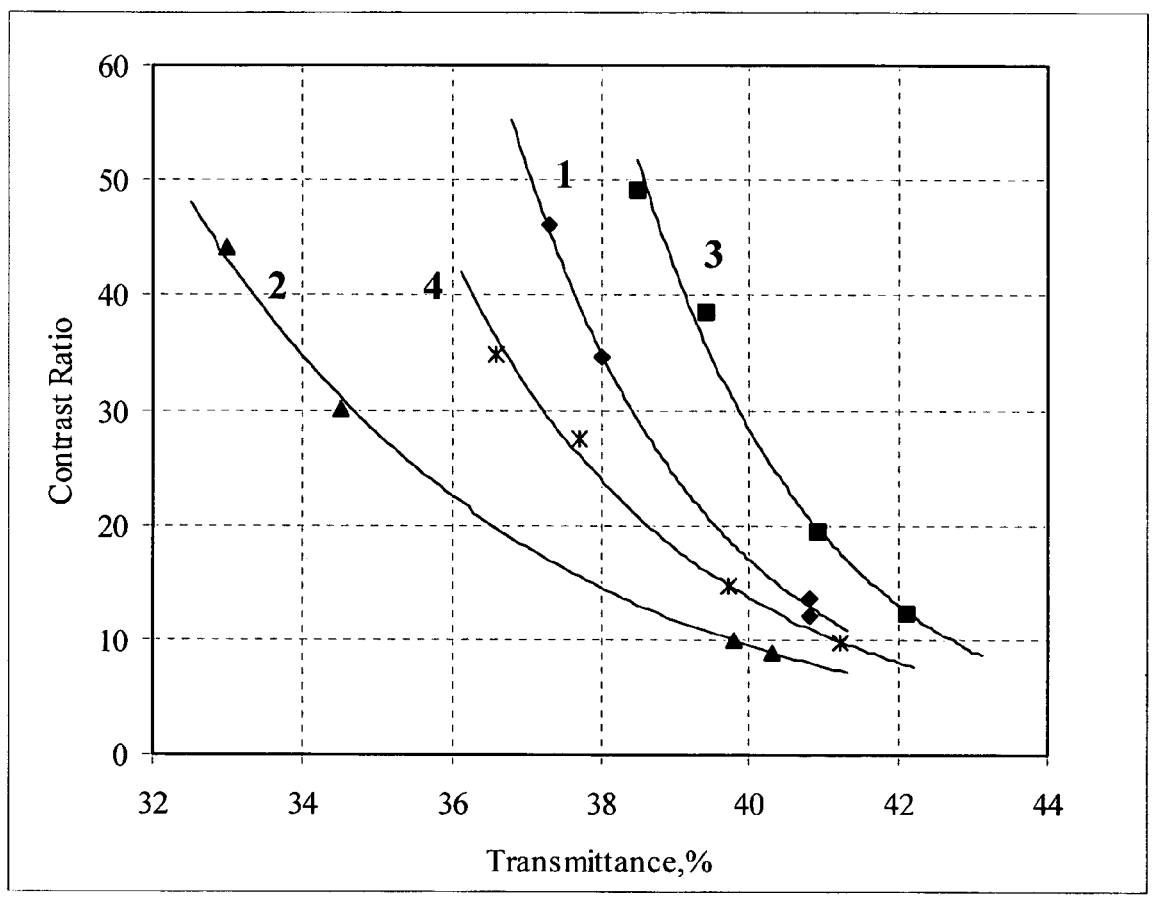
FIG. 4 shows CR-T curves for an insoluble TCF of INP with and without treatment with an impregnating solution MCGl before and after the environmental test. Non-treated TCF before (1) and after (2) the environmental test, TCF treated with MC(2.5%)+Gl(1.2%) solution before (3) and after (4) the environmental test.

The plots of contrast versus transmission for the untreated (control) TCFs and the (MC+Gl)-impregnated samples before and after the environmental test are presented in FIG. 4.

Example 4

A supramolecular composite film material was prepared as follows. An aqueous solution of the mixture of organic compound including sulfonated derivatives of indanthrone and perylenetetracarboxylic acid with a total concentration of 5% was evaporated using a rotor evaporator to a dye concentration of 10%. After adding surfactant Triton X-100, the resulting working concentration of the "blue-violet" ink was 7-8%.

The ink was applied onto the surface of a glass substrate with simultaneous orientation using a Mayer rod as the aligning instrument. The film application was performed at 20° C. and RH=65-70%. After drying under the same conditions, the TCF was converted into the water-insoluble form (Ba-form) by dipping for 1-2 s into a 10% aqueous solution of barium chloride ($BaCl_2$). Then, the sample was lifted up in a vertical position, washed with DI water and dried with air knife.

Theoretical characteristics of these TCFs (control samples) measured at room temperature and a relative humidity RH=45% are presented in Table 10.

TABLE 10

Polarizing parameters of TCF based on <<blue-violet>> inks (control samples) measured before baking

| | Transmittance, % | | | | | | |
|---|---|---|---|---|---|---|---|
| # | T | H0 | H90 | Ep | CR | Δ(CR) | Kd |
| 1 | 39.68 | 29.91 | 1.58 | 94.8 | 18.9 | | 15.1 |
| 2 | 38.97 | 29.06 | 1.31 | 95.6 | 22.2 | | 15.0 |
| 3 | 37.98 | 28.19 | 0.66 | 97.7 | 43.0 | | 16.5 |
| 4 | 37.53 | 27.53 | 0.64 | 97.7 | 43.3 | | 16.0 |
| 5 | 36.00 | 25.51 | 0.41 | 98.4 | 61.6 | | 15.3 |

In order to increase the thermal stability and improve the optical properties of TCFs based on the blue-violet ink, the TCFs after impregnation and drying are presented in Table 11.

TABLE 11

Polarizing parameters of TCF based on <<blue-violet>> inks measured before baking (samples were dipped in 2.5% MC + 1.25% GL solution)

| | Transmittance, % | | | | | | |
|---|---|---|---|---|---|---|---|
| # | T | H0 | H90 | Ep | CR | Δ(CR) | Kd |
| 6 | 40.17 | 30.85 | 1.43 | 95.5 | 21.6 | | 16.6 |
| 7 | 39.99 | 30.60 | 1.39 | 95.6 | 22.1 | | 16.4 |
| 8 | 39.88 | 30.66 | 1.16 | 96.3 | 26.5 | | 17.2 |
| 9 | 38.62 | 29.08 | 0.75 | 97.5 | 38.9 | | 17.1 |
| 10 | 38.14 | 28.46 | 0.63 | 97.8 | 45.5 | | 17.0 |
| 11 | 37.18 | 27.19 | 0.46 | 98.3 | 58.7 | | 16.6 |

Then, the control and (MC+Gl)-impregnated TCF samples were subjected to heating at 230° C. for 20 min (baking test). The optical characteristics of TCFs after baking are presented in Table 12.

TABLE 12

Polarizing parameters of impregnated TCFs based on <<blue-violet>> ink measured after baking

| | Transmittance, % | | | | | | |
|---|---|---|---|---|---|---|---|
| # | T | H0 | H90 | Ep | CR | Δ(CR) | Kd |
| | | | | Control | | | |
| 1 | 39.04 | 28.53 | 1.96 | 93.3 | 14.5 | | 13.0 |
| 2 | 38.06 | 27.02 | 1.95 | 93.0 | 13.8 | | 11.8 |
| 3 | 36.96 | 26.44 | 0.88 | 96.7 | 30.0 | | |
| 4 | 36.13 | 25.31 | 0.80 | 96.9 | 31.5 | | 13.2 |
| 5 | 34.69 | 23.64 | 0.43 | 98.2 | 55.1 | | 13.5 |
| | | | Impregnation by 2.5% MC + 1.25% Gl solution | | | | |
| 6 | 39.66 | 29.86 | 1.60 | 94.8 | 18.7 | | 15.0 |
| 7 | 39.75 | 30.01 | 1.59 | 94.8 | 18.8 | | 15.2 |

TABLE 12-continued

Polarizing parameters of impregnated TCFs based on
<<blue-violet>> ink measured after baking

| # | Transmittance, % | | | Ep | CR | Δ(CR) | Kd |
|---|---|---|---|---|---|---|---|
| | T | H0 | H90 | | | | |
| 8 | 39.62 | 30.06 | 1.33 | 95.7 | 22.6 | | 16.0 |
| 9 | 38.37 | 28.62 | 0.82 | 97.2 | 34.9 | | 16.2 |
| 10 | 37.82 | 27.87 | 0.74 | 97.4 | 37.4 | | 15.8 |
| 11 | 36.77 | 26.54 | 0.50 | 98.1 | 53.2 | | 15.7 |

Figure 5:
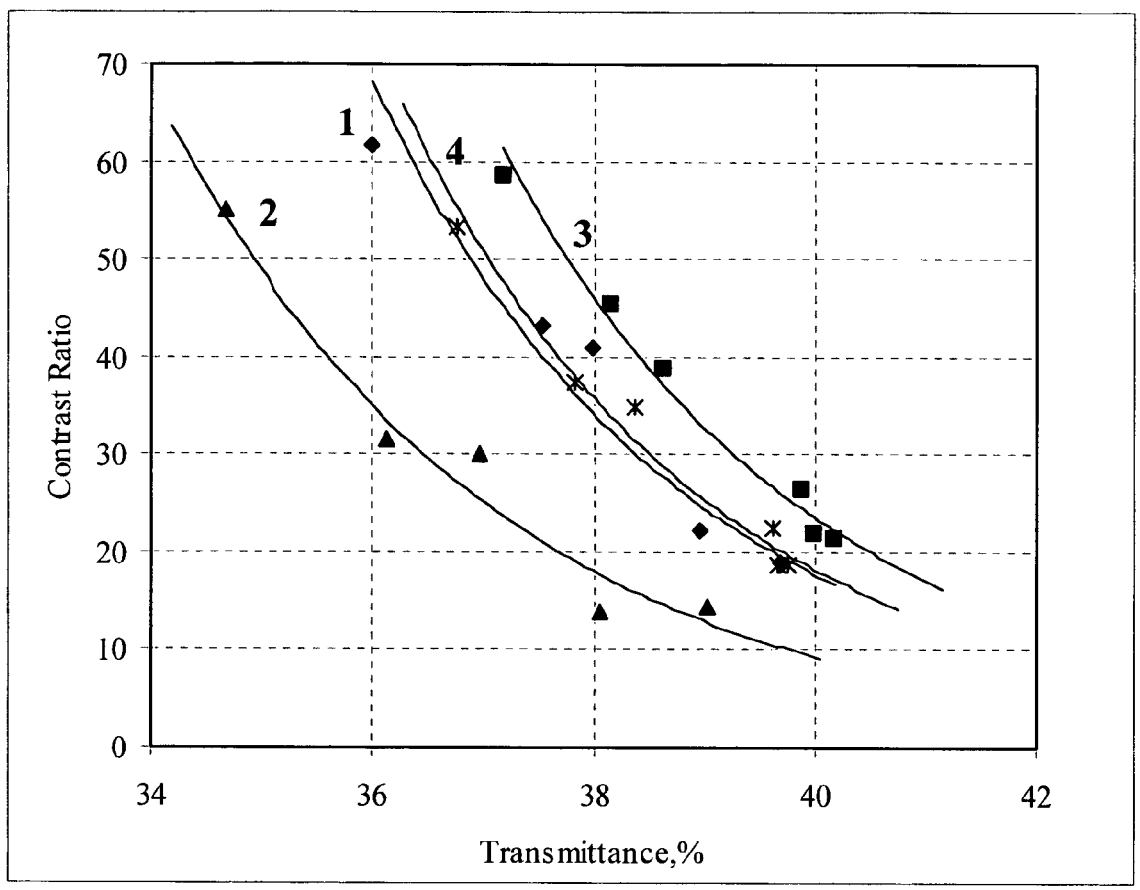
FIG. 5 shows CR-T curves for an insoluble TCF based on an aqueous solution of a mixture of sulfonated products of indanthrone with and without treatment with an impregnating solution before and after the baking test at 230° C. Non-treated TCF before (1) and after (2) the baking test, TCF treated with MC(2.5%)+Gl(1.2%) solution before (3) and after (4) the baking test.

The plots of contrast versus transmission for the untreated (control) TCFs and the (MC+Gl)-impregnated samples before and after the environmental test are presented in FIG. 5.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A method of fabricating supramolecular composite film materials, comprising the steps of forming a layer of lyotropic liquid crystal of supramolecules composed of cyclic organic molecules with conjugated π-systems and substituted polar groups, applying an external orienting force to said layer and subsequent removing a solvent with the resulting formation of a thin crystal film, treating said thin crystal film with a solution of inorganic salts leading to a formation of an insoluble crystalline film of supramolecules of said organic molecules, impregnating said insoluble film with a binding agent interacting with said polar groups with the formation of a filled film, and drying of said filled film leading to the formation of a supramolecular composite film material, wherein said inorganic salts are barium salts, said binding agent is selected from the group consisting of methylol carbamides and their derivatives and said cyclic organic molecules are dyes or dye derivatives.

2. The method of fabricating supramolecular composite film materials according to claim 1, wherein the content of said organic molecules in the lyotropic liquid crystal is in the range from approximately 3 to 50 mass %.

3. The method of fabricating supramolecular composite film materials according to claim 2, wherein the content of said organic molecules in the lyotropic liquid crystal is in the range from approximately 7 to 30 mass %.

4. The method of fabricating supramolecular composite film materials according to claim 1, wherein said lyotropic liquid crystal is based on water or in a mixture of water and an organic solvent miscible with water.

5. The method of fabricating supramolecular composite film materials according to claim 1, wherein said lyotropic liquid crystal further comprises up to 5 mass % of surfactants.

6. The method of fabricating supramolecular composite film materials according to claim 1, wherein said lyotropic liquid crystal further comprises up to 5 mass % of plasticizers.

7. The method of fabricating supramolecular composite film materials according to claim 1, wherein said external orienting force is mechanical shear of said layer.

8. The method of fabricating supramolecular composite film materials according to claim 1, wherein said external orienting force comprises one or several external forces selected from the list of applying an electric and magnetic field.

9. The method of fabricating supramolecular composite film materials according to claim 1, wherein the step of removing the solvent from the lyotropic liquid crystal is performed at a temperature between approximately 20 and 60° C. and a relative humidity from 40 to 70%.

10. The method of fabricating supramolecular composite film materials according to claim 9, wherein the solvent is removed at a temperature of approximately 20° C. for less than approximately 1 hour.

11. The method of fabricating supramolecular composite film materials according to claim 1, wherein said solution concentration is in the interval from approximately 5 to 30 mass %.

12. The method of fabricating supramolecular composite film materials according to claim 11, wherein said solution concentration is in the preferred interval from approximately 10 to 20 mass %.

13. The method of fabricating supramolecular composite film materials according to claim 1, wherein said insoluble crystalline film before impregnation with the binding agent is washed with water and then dried at a temperature between 20 and 70° C. for approximately less than 20 min.

14. The method of fabricating supramolecular composite film materials according to claim 1, wherein an aqueous solution of the binding agent is used for the impregnation.

15. The method of fabricating supramolecular composite film materials according to claim 1, wherein said binding agent is used in the range of concentrations from approximately 0.5 to 20 mass %.

* * * * *

UNITED STATES PATENT AND TRADEMARK OFFICE
CERTIFICATE OF CORRECTION

| | | |
|---|---|---|
| PATENT NO. | : 7,651,738 B2 | Page 1 of 1 |
| APPLICATION NO. | : 11/132746 | |
| DATED | : January 26, 2010 | |
| INVENTOR(S) | : Grodsky et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Twenty-third Day of November, 2010

David J. Kappos
*Director of the United States Patent and Trademark Office*